US010861443B2

(12) United States Patent
Xu

(10) Patent No.: US 10,861,443 B2
(45) Date of Patent: Dec. 8, 2020

(54) CONTINUOUS SPEECH RECOGNITION USING DUAL NEURAL NETWORKS

(71) Applicant: Eta Compute, Inc., Westlake Village, CA (US)

(72) Inventor: Chao Xu, Thousand Oaks, CA (US)

(73) Assignee: Eta Compute, Inc., Westlake Village, CA (US)

( * ) Notice: Subject to any disclaimer, the term of this patent is extended or adjusted under 35 U.S.C. 154(b) by 159 days.

(21) Appl. No.: 16/368,137

(22) Filed: Mar. 28, 2019

(65) Prior Publication Data

US 2020/0312308 A1 Oct. 1, 2020

(51) Int. Cl.
*G10L 15/16* (2006.01)
*G10L 15/19* (2013.01)
*G06N 3/04* (2006.01)
*G06N 3/08* (2006.01)

(52) U.S. Cl.
CPC .......... *G10L 15/16* (2013.01); *G06N 3/0454* (2013.01); *G06N 3/08* (2013.01); *G10L 15/19* (2013.01)

(58) Field of Classification Search
CPC ..... G06F 16/3329; G06F 3/167; G06N 20/00; G06N 5/02; G06N 3/0454; G06N 3/08; G06N 5/04; G10L 15/193; G10L 15/22; G10L 15/16; G10L 15/19; G10L 15/08; G10L 2015/088
See application file for complete search history.

(56) References Cited

U.S. PATENT DOCUMENTS 8,775,341 B1 7/2014 Commons
10,176,811 B2 1/2019 Xue

OTHER PUBLICATIONS

Meyer, et al., Efficient Convolutional Neural Network for Audio Event Detection, Journal, submitted Sep. 28, 2017, https://arxiv.org/abs/1709.09888, 5 total pages.
Phan et al., Enabling Early Audio Event Detection With Neural Networks, Journal, submitted Dec. 6, 2017, https://arxiv.org/abs/1712.02116, 5 total pages.
Cakir, et al., Convolutional Recurrent Neural Networks for Rare Sound Event Detection, Journal, Detection and Classification of Acoustic Scenes and Events 2017, Nov. 16, 2017, http://www.cs.tut.fi/~cakir/publications/convolutional-recurrent-dcase2017.pdf, 5 total pages.
Cakir, et al.,Convolutional Recurrent Neural Networks for Polyphonic Sound Event Detection, Journal, http://www.cs.tut.fi/~cakir/publications/CRNN_TASLP_2017.pdf, last accessed Feb. 20, 2019, 13 total pages.

(Continued)

*Primary Examiner* — Mohammad K Islam
(74) *Attorney, Agent, or Firm* — SoCal IP Law Group LLP; Angelo Gaz; Steven Sereboff

(57) ABSTRACT

Automatic speech recognition (ASR) systems and methods. An ASR system includes a vector memory to store a plurality of feature vectors sequentially extracted from an audio data stream. A first neural network performs speech recognition processing on feature vectors stored in the vector memory to attempt to recognize a word from a predetermined vocabulary. A second neural network controls when the first neural network performs the speech recognition processing. The first neural network is held in a quiescent state except when performing the speech recognition processing under control of the second neural network.

21 Claims, 12 Drawing Sheets

(56) References Cited

OTHER PUBLICATIONS

Namrata Dave, Feature Extraction Methods LPC, PLP and MFCC In Speech Recognition, Journal, International Journal for Advance Research in Engineering and Technology, vol. 1, Issue VI, Jul. 2013, https://pdfs.semanticscholar.org/0b44/265790c6008622c0c3de2aa1aea3ca2e7762.pdf, 5 total pages.

US 10,861,443 B2

CONTINUOUS SPEECH RECOGNITION USING DUAL NEURAL NETWORKS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to automatic speech recognition using neural networks.

Description of the Related Art

Artificial neural networks are computing systems inspired by the biological networks of animal brains. An artificial neural network is based on a collection of connected units or nodes called artificial neurons, which have similar function to the neurons in a biological brain. Artificial neural networks have been used on a variety of tasks, including computer vision, speech recognition, machine translation, social network filtering, game playing, and medical diagnosis. Within this patent, the terms "neural network" and "neuron" refer to artificial networks and artificial neurons, respectively.

Within a neural network, each neuron typically has multiple inputs and a single output that is a function of those inputs. Most commonly, the output of each neuron is a function of a weighted sum of its inputs, where the weights applied to each input are set or "learned" to allow the neural network to perform some desired function. Neurons may be broadly divided into two categories based on whether or not the neuron stores its "state", which is to say stores one or more previous values of its output.

FIG. 1A is a schematic representation of a neuron 110 that does not store its state. The operation of the neuron 110 is governed by equation 001.

$$y = \Phi\left(\sum_{j=1}^{n} x_j w_j\right) \qquad 001$$

The neuron 110 has n inputs (where n is an integer greater than or equal to one) $x_1$ to $x_n$. A corresponding weight $w_1$ to $w_n$ is associated with each input. The output y of the neuron 110 is a function $\Phi$ of a weighted sum of the inputs, which is to say the sum of all of the inputs multiplied by their respective weights. Each input may be an analog or binary value. Each weight may be a fractional or whole number. The function $\Phi$ may be a linear function or, more typically, a nonlinear function such as a step function, a rectification function, a sigmoid function, or other nonlinear function. The output y may be a binary or analog value. The output y is a function of the present values of the inputs $x_1$ to $x_n$, without dependence on previous values of the inputs or the output.

FIG. 1B is a schematic representation of a neuron 120 that stores its previous output value or state. The operation of the neuron 120 occurs in discrete time intervals or frames. The operation of the neuron in frame k is governed by equation 002.

$$y_k = \Phi\left(\sum_{j=1}^{n} x_{j,k} w_j + f y_{k-1}\right) \qquad 002$$

The neuron 120 has n inputs (where n is an integer greater or equal to than one), where $x_{1,k}$ to $x_{n,k}$ are the values of the inputs at frame k. A corresponding weight $w_1$ to $w_n$ is associated with each input. The neuron 120 has an output $y_k$ (the output value at frame k) and stores a previous state $y_{k-1}$ (the output value at previous frame k-1). In this example, the stored state $y_{k-1}$ is used as an input to the neuron 120. The output $y_k$ is a function $\Phi$ of a weighted sum of the inputs at time k plus $y_{k-1}$ multiplied by a feedback weight f. Each input $x_{1,k}$ to $x_{n,k}$, the output $y_k$, and the stored state $y_{k-1}$ may be, during any frame, an analog or binary value. Each weight w and f may be a fractional or whole number. The function $\Phi$ may be a linear function or, more typically, a nonlinear function as previously described.

The stored state of a neuron is not necessarily returned as an input to the same neuron, and may be provided as an input to other neurons. A neuron may store more than one previous state. Any or all of the stored states may be input to the same neuron or other neurons within a neural network.

Neurons such as the neurons 110 and 120 can be implemented as hardware circuits. More commonly, particularly for neural nets comprising a large number of neurons, neurons are implemented by software executed by a processor. In this case the processor calculates the output or state of every neuron using the appropriate equation for each neuron.

Neurons that do not store their state will be referend to herein as "non-state-maintaining" (NSM) and neurons that do store their state will be referred to herein as "state-maintaining" (SM). Neural networks that incorporate at least some SM neurons will be referred to herein as SM networks. Examples of SM neural networks include recursive neural networks, long short-term memory networks, echo state networks, and time-delay neural networks. Neural networks incorporating only NSM neurons will be referred to herein as NSM networks.

Throughout this description, elements appearing in figures are assigned three- or four-digit reference designators, where the two least significant digits are specific to the element and the most significant digit(s) is(are) the figure number where the element is introduced. An element that is not described in conjunction with a figure may be presumed to have the same characteristics and function as a previously-described element having the same reference designator.

DETAILED DESCRIPTION

There is a need for a continuous automatic speech recognition (ASR) system that can recognize a limited vocabulary while minimizing power consumption. The continuous ASR system needs to be able to continuously identify recognizable words (e.g., the limited vocabulary) in an audio data stream that that may contain numerous other spoken words. The continuous ASR system may be powered on, receiving audio data, and performing speech recognition over an extended period of time. Preferably, the ASR system will recognize words within its limited vocabulary without wasting power processing unwanted words or sounds. Additionally, the ASR system will preferably recognize words within its vocabulary in a continuous audio stream without having to be turned on or prompted by a user just before a user speaks a word or command. Such an ASR system may be applied, for example, in game controllers, remote controls for entertainment systems, and other portable devices with limited battery capacity.

Figure 1B:
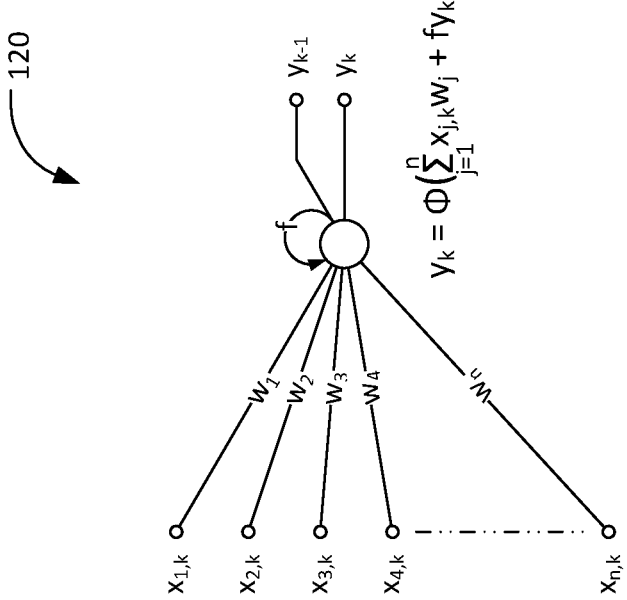
FIG. 1B is a schematic representation of a state-maintaining neuron.
Figure 1A:
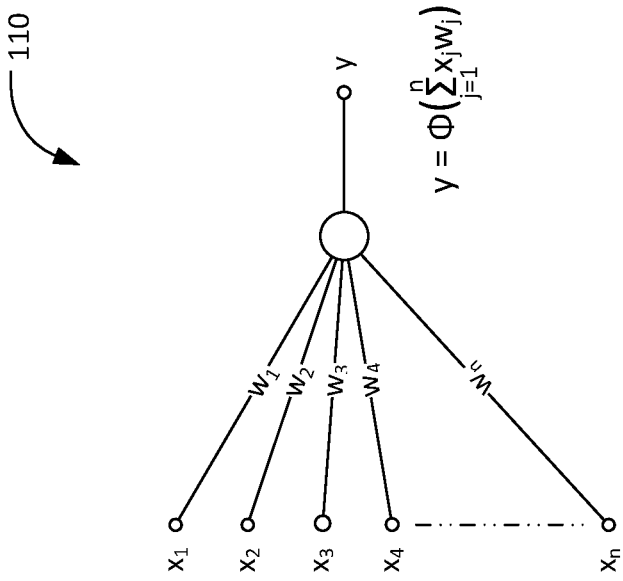
FIG. 1A is a schematic representation of a non-state-maintaining neuron.
Figure 2:
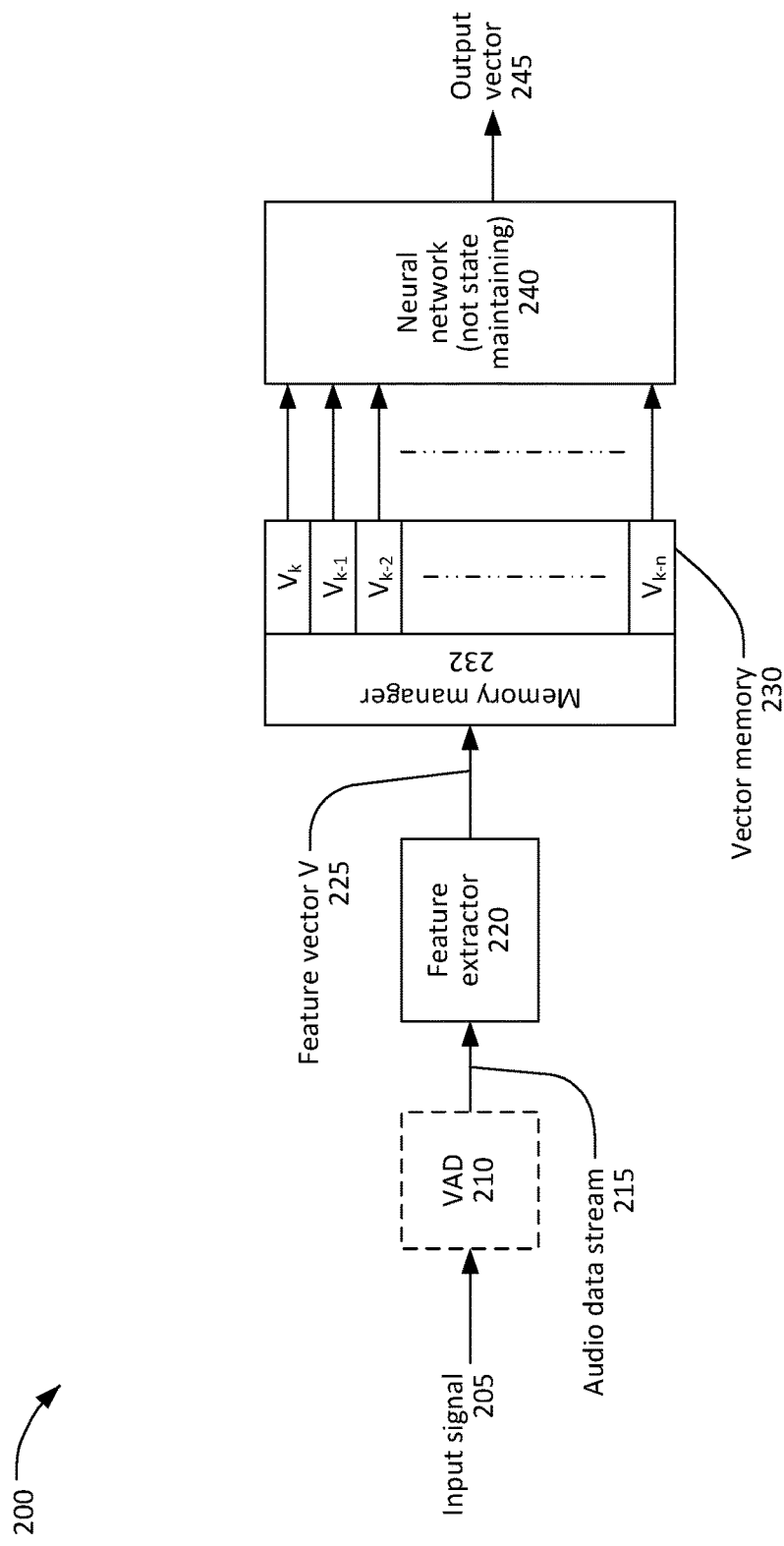
FIG. 2 is a functional block diagram of an exemplary conventional speech recognition system.

FIG. 2 is a functional block diagram of a representative conventional continuous ASR system 200 using a neural network. Numerous different ASR system architectures using neural networks have been developed. The ASR system 200 is a simplified example provided to illustrate some of the problems with some conventional systems. The ASR system 200 includes an optional voice activity detector (VAD) 210, a feature extractor 220, a vector memory 230, and an NSM neural network 240.

The input signal 205 to the ASR system 200 may be an analog signal or a time-varying digital value. In either case, the input signal 205 is typically derived from a microphone.

The output of the ASR system 200 is an output vector 245, which is a list of probabilities that the input signal 205 contains respective words. For example, assume the ASR system 200 has a vocabulary of twenty words. In this case, the output vector 245 may have twenty elements, each of which indicate the probability that the input signal contains or contained the corresponding word from the vocabulary. Each of these elements may be converted to a binary value (e.g. "1"=the word is present; "0"=the word is not present) by comparing the probability to a threshold value. When two or more different words are considered present in the audio data stream at the same time, additional processing (not shown) may be performed to select a single word from the vocabulary. For example, when multiple words are considered present, a particular word may be selected based on the context established by previously detected words.

The VAD 210, when present, receives the input signal 205 and determines whether or not the input signal 205 contains, or is likely to contain, the sound of a human voice. For example, the VAD 210 may simply monitor the power of the input signal 205 and determine that speech activity is likely when the power exceeds a threshold value. The VAD 210 may include a bandpass filter and determine that voice activity is likely when the power within a limited frequency range (representative of human voices) exceeds a threshold value. The VAD may detect speech activity in some other manner. When the input signal 205 is a time-varying digital value, the VAD may contain digital circuitry or a digital processor to detect speech activity. When the input signal 205 is an analog signal, and the VAD may contain analog circuitry to detect speech activity. In this case, the input signal 205 may be digitized after the VAD such that a time-varying digital audio data stream 215 is provided to the feature extractor 220. When speech or speech activity is not detected, the other elements of the ASR system 200 may be held in a low power or quiescent state in which they do not process the input signal or perform speech recognition processing. When speech activity is detected (or when the VAD 210 is not present), the elements of the ASR system 200 process the input signal 205 as described in the following paragraphs.

When the VAD 210 indicates the input signal contains speech, the feature detector 220 divides the input signal into discrete or overlapping time slices commonly called "frames". For example, European Telecommunications Standards Institute standard ES 201 108 covers feature extraction for voice recognition systems used in telephones. This standard defines frame lengths of 23.3 milliseconds and 25 milliseconds, depending on sampling rate. Each frame encompasses 200 to 400 digital signal samples. In all cases, the frame offset interval, which is the time interval between the start of the current frame and the start of the previous frame, is 10 milliseconds, such that successive frames overlap in time. Other schemes for dividing a voice signal into frames may be used.

The feature extractor 220 converts each frame into a corresponding feature vector 225. Each feature vector contains information that represents, or essentially summarizes, the signal content during the corresponding time slice. A feature extraction technique commonly used in speech recognition systems is to calculate mel-frequency cepstral coefficients (MFCCs) for each frame. To calculate MFCCs, the feature extractor performs a windowed Fourier transform to provide a power spectrum of the input signal during the frame. The windowed Fourier transform transforms the frame of the input signal 205 from a time domain representation into a frequency domain representation. The power spectrum is mapped onto a set of non-uniformly spaced frequency bands (the "mel frequency scale") and the log of the signal power within each frequency band is calculated. The MFCCs are then determined by taking a discrete cosine transform of the list of log powers. The feature extractor may extract other features of the input signal in addition to, or instead of, the MFCCs. For example, ES 201 108 defines a 14-element speech feature vector including 13 MFCCs and a log power value. Fourteen elements may be a minimum, or nearly a minimum, practicable length for a speech feature vector and other feature extractions schemes may extract as many as 32 elements per frame.

Each feature vector contains a representation of the input signal during a corresponding time frame. Under the ES 201 108 standard, the feature extractor divides each second of speech into 100 frames represented by 100 feature vectors, which may be typical of current speech recognition systems. However, a speech recognition system may generate fewer than or more than 100 feature vectors per second. An average rate for speech is four or five syllables per second. Thus the duration of a single spoken word may range from about 0.20 second to over 1 second. Assuming the feature extractor 220 generates 100 feature vectors per second, a single spoken word may be captured in about 20 to over 100 consecutive feature vectors.

When an NSM neural network is used to perform speech recognition processing, the output of the neural network depends solely on the present inputs to the network without consideration of the previous time history of those inputs. Thus, for an NSM neural network to recognize a word captured in a series of feature vectors, all or a significant portion of the feature vectors that capture the word usually must be available to the NSM neural network concurrently.

The ASR system 200 includes a vector memory 230 to store n+1 consecutive feature vectors from the feature extractor 220, where n is appositive integer, $v_k$ is the feature vector extracted from a current frame k and $v_{k-n}$ is the feature vector extracted n frames earlier. Continuing the previous example (where 100 feature vectors are extracted per second), n may be an integer between about 20 to more than 100. The vector memory 230 may be functionally equivalent to a shift register, where the most recent feature vectors is stored at the top (as shown in FIG. 2) of the shift register and the oldest feature vector is discarded from the bottom of the shift register. In practice, the vector memory 230 may be implemented in random access memory and a memory manager 232 may maintain address pointers indicating where the newest feature vector should be stored (typically replacing the oldest stored feature vector). A new feature vector is stored in the vector memory 230 every frame offset interval. The n+1 feature vectors stored in the vector memory 230 are concurrently available as inputs to the neural network 240.

The neural network 240 performs speech recognition processing of the content of the vector memory 230. The neural network 240 may be a "deep" neural network divided into multiple ranks of neurons including an input rank of neurons that receives feature vectors from the vector memory 230, an output rank that generates the output vector 245, and one or more intermediate or "hidden" ranks. For example, the neural network 240 may be a convolutional neural network (CNN) similar to CNNs currently used for picture and speech recognition. The number of hidden ranks and the number of neurons per rank in the neural network 240 depend, to some extent, on the number of words in the vocabulary to be recognized. Typically, each input to the neural network 240 receives one element of one of the feature vectors stored in the vector memory 230, and each element of each stored feature vector is provided to at least one input of the neural network 240. The neural network 240 may be designed and trained using known methods.

The functional elements of the voice recognition system 200 may be implemented in hardware or implemented by a combination of hardware, software, and firmware. The feature extractor 220, the memory manager 232, and/or the neural network may be implemented in hardware. Some or all of the functions of the feature extractor 220, the memory manager 232, and the neural network may be implemented by software executed on one or more processors. The one or more processors may be or include microprocessors, graphics processors, digital signal processors, and other types of processors. The same or different processors may be used to implement the various functions of the speech recognition system 200.

In the speech recognition system 200, the neural network 240 performs speech recognition processing on the content of the vector memory every frame offset interval (or every frame offset interval when the optional VAD indicates the input potentially contains voice activity). However, even when a recognizable word has been input, the neural network may only recognize that word when most or all of the feature vectors representing the word are stored in the vector memory 230. For example, every word has a duration, and a word may be recognizable only when feature vectors corresponding to all or a substantial portion of the duration are available. Any processing performed by the neural network 240 before most or all of the feature vectors representing a word are available in the vector memory may be unproductive. Similarly, processing performed while the feature vectors representing a particular word are being replaced by new feature vector representing a subsequent word may also be unproductive. In either event, unproductive processing results in unnecessary and undesirable power consumption.

In the speech recognition system 200, the neural network 240 must be sufficiently fast to complete the speech recognition processing of the content of the vector memory 230 in the frame offset interval between the storage of one feature vector and the storage of the subsequent feature vector. For example, frame offset interval is 10 ms in systems conforming to the ES 201 108 standard. Assuming the neural network is implemented by software instructions executed by one or more processors, the aggregate processor speed must be sufficient to evaluate the characteristic equations, such as equation 001 above, for all of the neurons in the neural network. Each frame offset interval, the neural network 240 may need to retrieve several hundred to several thousand vector elements from the vector memory 230 and evaluate the characteristic equations for hundreds or thousands of neurons. The required processing speed of the neural network 240 may be substantial, and the power consumption of the neural network 240 can be problematic or unacceptable for portable devices with limited battery capacity.

Figure 3:
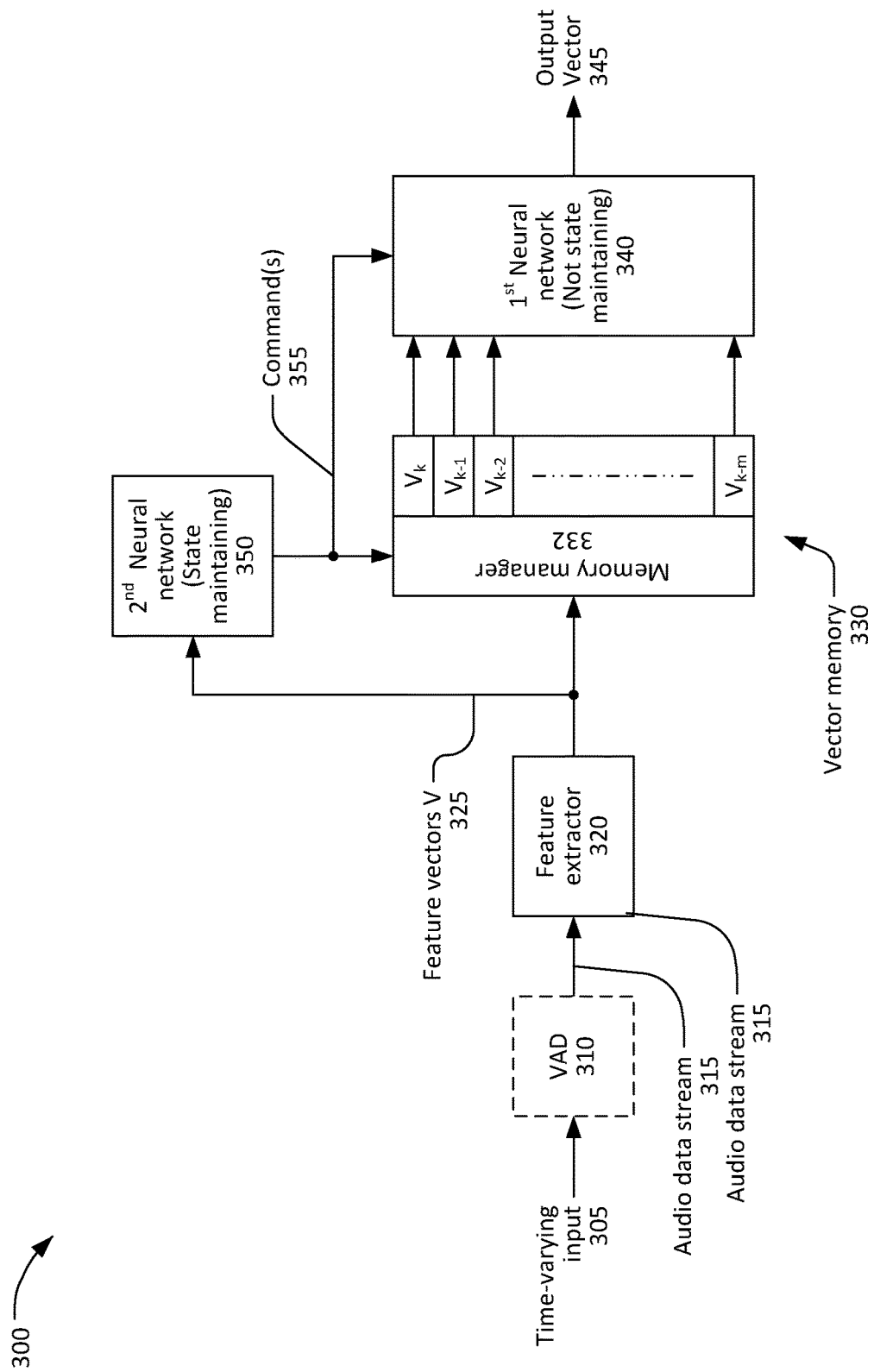
FIG. 3 is a functional block diagram of a continuous speech recognition system using dual neural networks.

FIG. 3 is a functional block diagram of an improved continuous ASR system 300 including an optional voice activity detector (VAD) 310, a feature extractor 320, a vector memory 330, a first neural network 340, and a second neural network 350. The VAD 310 and the feature extractor 320 may be similar or identical to the corresponding elements 210 and 220 of the ASR system 200 of FIG. 2. Descriptions of these functional elements will not be repeated. The vector memory 330 stores consecutive feature vectors extracted from the audio data stream 315 by the feature extractor 320. The vector memory 330 is similar to the vector memory 230 except that, in some embodiments of the ASR system 300, the memory manager 332 operates under control of the second neural network 350, as will be subsequently described.

The first neural network 340 is configured to recognize words by performing speech recognition processing on feature vectors stored in the vector memory. The first neural network 340 may be a deep neural network divided into multiple ranks of neurons including an input rank of neurons that receives feature vectors from the vector memory 330, an output rank that generates an output vector 345, and one or more intermediate or "hidden" ranks. For example, the neural network 340 may be a convolutional neural network (CNN) similar to CNNs currently used for picture and speech recognition. The first neural network 340 may be similar to, or the same as, the neural network 240 in the ASR system 200 of FIG. 2, except that network 340 is also controlled by the second neural network 350. The first neural network 340 may be designed and trained using known methods.

The second neural network 350 is configured to determine when the first neural network 340 should perform the speech recognition processing on the content of the vector memory to attempt to recognize a word. To this end, the second neural network 350 receives the stream of feature vectors 325 from the feature extractor 320 and determines when the stream of feature vectors represents, or is likely to represent, a recognizable word. The second neural network 350 outputs one or more commands 355 to cause the first neural network 340 to perform the speech recognition processing on the content of the vector memory only when the vector memory contains a sufficient number of feature vectors representing (or likely to represent) a recognizable word. At other times, the first neural network 340 remains in a low power quiescent state. The first neural network 340 does not perform speech recognition processing when it is in the quiescent state. Operating the first neural network 340 on as "as-needed" basis results in a significant reduction in power consumption compared to the speech recognition system 200 where the neural network 240 processes the content of the vector memory 230 every frame offset interval.

The second neural network 350 provides one or more commands 355 to the first neural network 340 and, in some embodiments, the memory manager 332. When the elements of the ASR system 300 are implemented in hardware, the second neural network 350 may provide the commands 355 in the form of control signals to the first neural network 340 and the memory manager 332. When the first and second neural networks are implemented using software executed by the same or different processors, the second neural network 350 may issue the commands 355 by setting a flag, generating an interrupt, making a program call, or some other method.

The second neural network 350 may be a state-maintaining network that controls the first neural network based on current feature vector input and, to at least some extent, one or more previous states of the neural network. For example, the second neural network 350 may be an echo state network or some other type of recurrent neural network. Within the second neural network, at least some neurons save respective prior states. The saved prior states are provided as inputs to at least some neurons. The second neural network 350 may be designed and trained using known methods.

Figure 4:
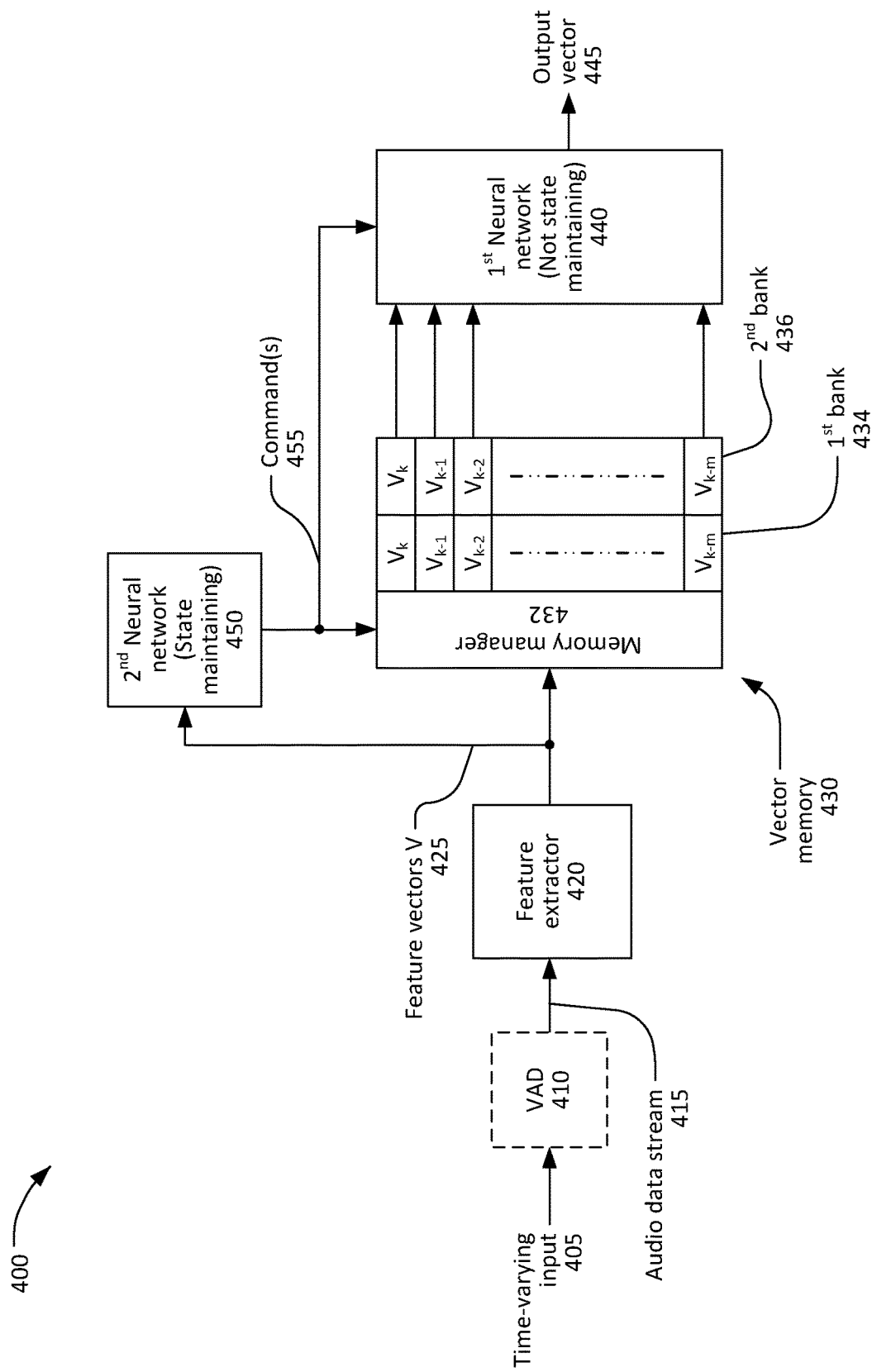
FIG. 4 is a functional block diagram of another continuous speech recognition system using dual neural networks.

FIG. 4 is a functional block diagram of another improved continuous ASR system 400 including an optional voice activity detector (VAD) 410, a feature extractor 420, a vector memory 430, a first neural network 440 and a second neural network 450. The VAD 410, the feature extractor 420, the first neural network 440, and the second neural network 450 may be similar or identical to the corresponding elements 310, 320, 340 and 350 of the ASR system 300 of FIG. 3. Descriptions of these functional elements will not be repeated.

The vector memory 430 is similar function to the vector memory 330 except that the vector memory 430 includes two memory banks 434, 436. At any time, a first memory bank of the two memory banks 434, 436 can be used to accumulate new feature vectors 425 extracted by the feature extractor 420 from the audio data stream 415. At the same time, the second memory bank holds feature vectors for speech recognition processing by the first neural network 440. The functions of the two memory banks 434, 436 may be reversed, for example, for alternate words. The memory manager 432 controls the writing of feature vectors into the appropriate memory bank 434, 436 based on a command 455 from the second neural network.

Since the feature vectors representing a word to be recognized are held in one of the two memory banks 434, 436 while the other memory bank accumulates new feature vectors, the first neural network 440 need not complete the speech recognition processing on the held feature vectors within the frame offset interval between two successive frames (e.g. within 10 ms under ES 201 108). Rather, the first neural network 440 need only complete the speech recognition processing before the other memory bank is finished accumulating the feature vectors for a next word to be recognized (and the functions of the two memory banks are reversed). The first neural network 440 may use up to the minimum time interval anticipated between two words to complete the speech recognition processing of the stored feature vectors. Extending the time available for processing the content of one of the memory banks 434, 436 reduces the required processing speed of the first neural network 440. For example, assuming the minimum time interval between consecutive words to be recognized is 0.25 second, the processing speed of the first neural network 440 in the ASR system 400 is ½₅ of the processing speed required of the first neural network 340 in the ASR system 300. Reducing the processing speed results in a roughly proportional reduction in the power consumption of the first neural network 440.

Figure 5:
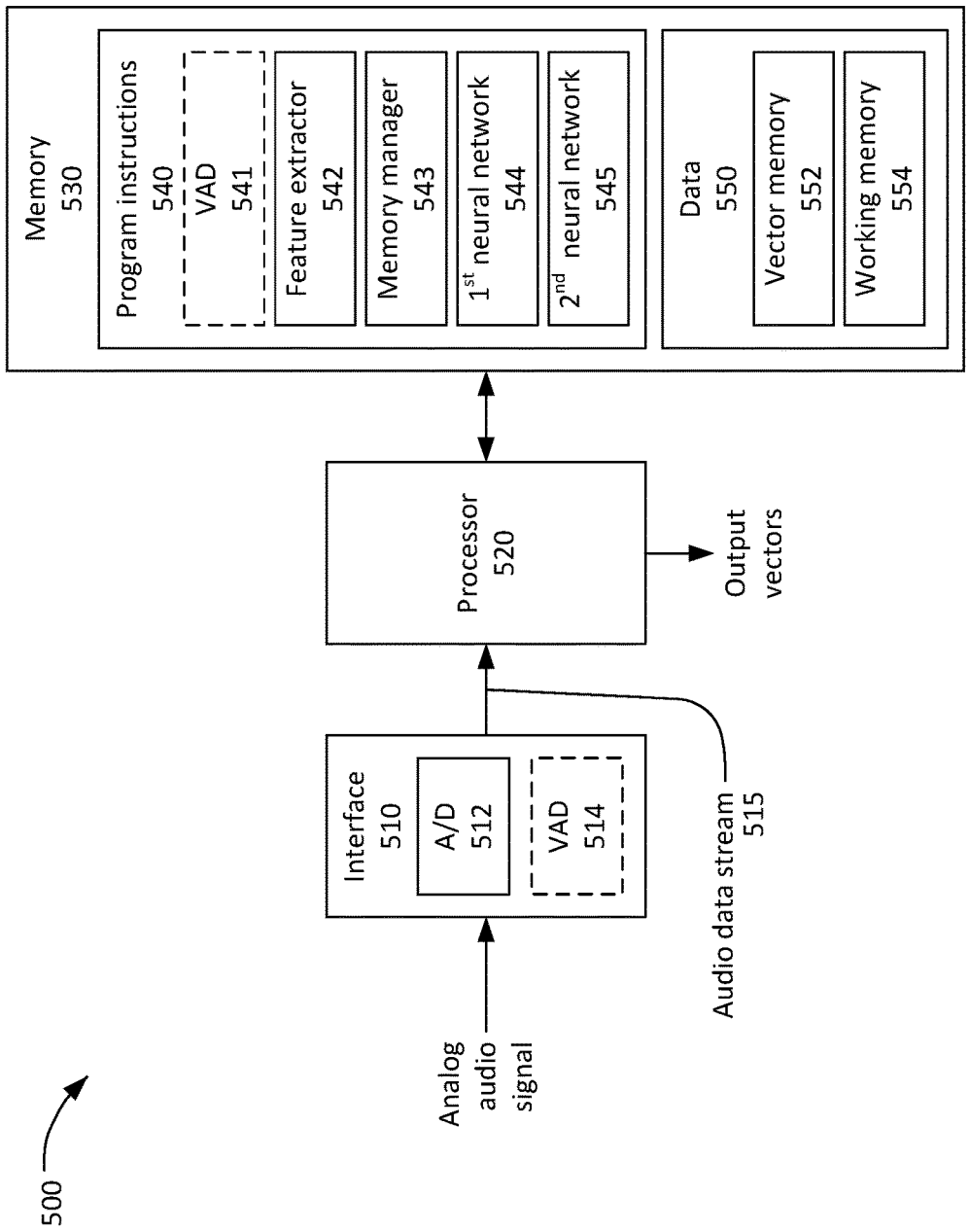
FIG. 5 is a block diagram of a continuous speech recognition system using dual neural networks.

FIG. 5 is a block diagram of a continuous ASR system 500 in which first and second neural networks are implemented by software executed by one or more processing devices. The ASR system 500 may be the ASR system 300 of FIG. 3 or the ASR system 400 of FIG. 4. The ASR system 500 includes an interface 510, a processor 520 and a memory 530. In this context, a "processor" is a set of digital circuits that executes stored instructions to perform some function. A "memory" is a device for storing digital information such as data and program instructions. The term "memory" encompasses volatile memory such as semiconductor random access memory. The term "memory" also encompasses nonvolatile memory such as semiconductor read-only memory and flash memory and storage devices that store data on storage media such as magnetic and optical discs. The term "storage media" means a physical object for storing data and specifically excludes transitory media such as signals and propagating waves.

Assuming the input to the ASR system 500 is an analog signal from a microphone, such as signal 305 or 405, the interface 510 includes an analog to digital converter (A/D) 512 to output an audio data stream 515 and, optionally, a voice activity detector 514 implemented in analog or digital hardware.

The processor 520 executes instructions stored in the memory 530 to perform the functions of the feature extractor, memory manager, first and second neural networks, and (optionally) voice activity detector of the ASR system 300 or the ASR system 400. The processor 520 may include one or more processing devices, such as microprocessors, digital signal processors, graphics processors, programmable gate arrays, application specific circuits, and other types of processing devices. Each processing device may execute stored instructions to perform all or part of one or more of the functions of the ASR system 500. Each function of the ASR system 500 may be performed by a single processing device or may be divided between two or more processing devices.

To realize the reduction in power consumption possible with this ASR system architecture, the processing device or devices that implement the first neural network need to be capable of transitioning between an active mode and a low (or zero) power quiescent mode. The processing device or devices that implement the first neural network may be placed in the quiescent mode except when performing speech recognition processing on the content of the vector memory under control of the second neural network. When a single processing device implements more than one function of the ASR system, the processing device may be in an active mode for a portion of each frame and a quiescent mode during another portion of each frame offset interval.

For example, in the case where a single processing device implements all of the functions of the ASR system, a small time interval at the start of each frame offset interval may be dedicated to the VAD function. When the VAD function determines the input data includes voice activity, a time interval immediately following the VAD function may be used to implement the feature extract function and memory manager functions. An additional time interval may be used to implement the second neural network. The remaining time (which may be a majority of the frame offset interval) may be reserved to implement the first neural network. The processor may be in its quiescent state during the time reserved for implementing the first neural network except when performing speech recognition processing on the content of the vector memory to recognize a word in response to a command provided by the second neural network.

The memory 530 stores both program instructions 540 and data 550. The stored program instructions 540 include instructions that, when executed by the processor 520, cause the processor 520 to implement the various function of the ASR system 500. The stored program instructions 540 may include instructions 541 for the voice activity detector (VAD) function if that function is not implemented within the interface 510. The stored program instructions 540 include instructions 542 for the feature extractor function, instructions 543 for the memory manager function, instructions 544 for the first neural network function, and instructions 545 for the second neural network function.

Data 550 stored in the memory 530 includes a single-bank or dual-bank vector memory 552 to store feature vectors, and a working memory 554 to store other data including intermediate results of the various functions.

Figure 6:
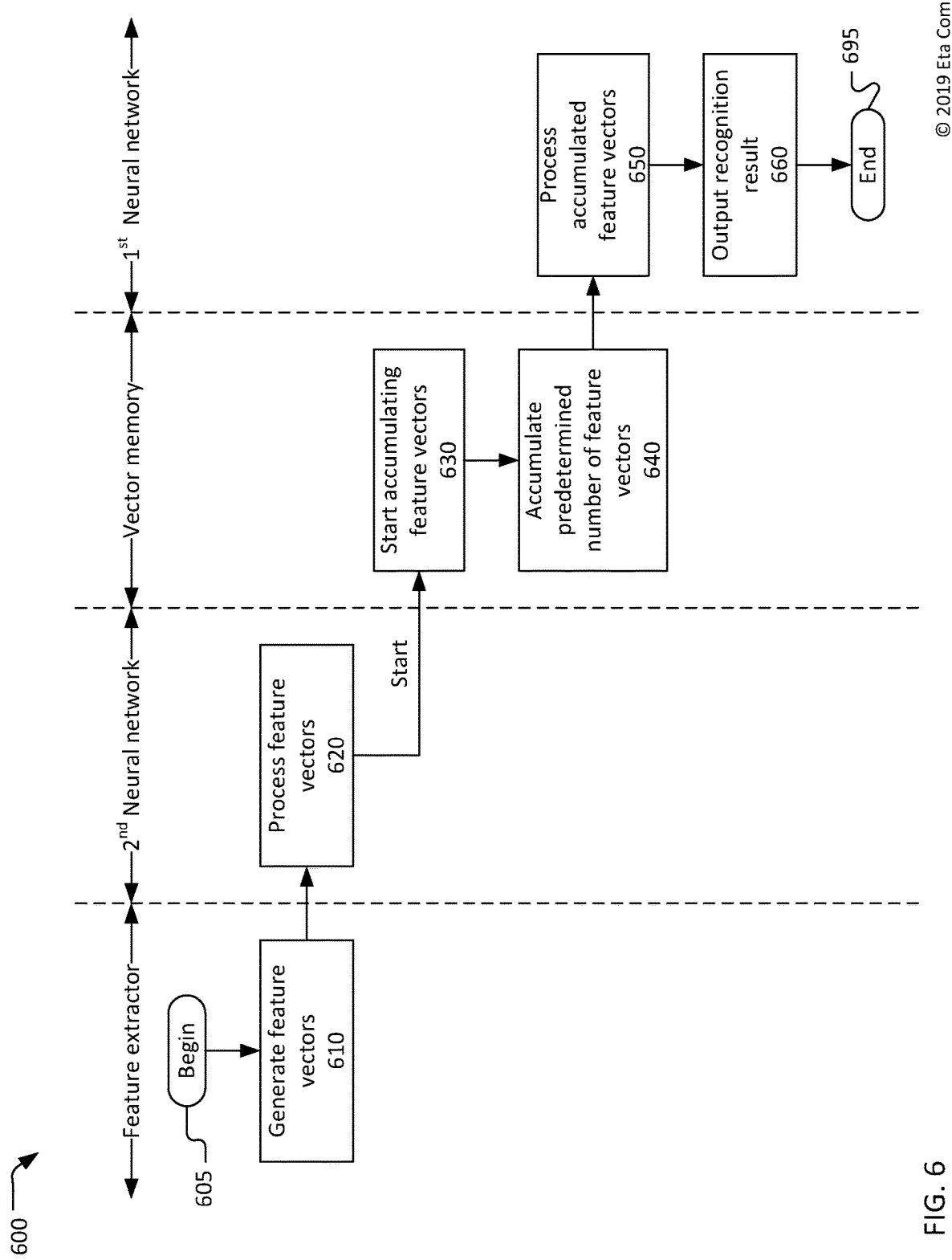
FIG. 6 is a flow chart of the operation of a continuous speech recognition system.

FIG. 6 is a flow chart of a process 600 for recognizing a word. The process 600 may be performed by an ASR system including a feature extractor, a first neural network, a vector memory, and a second neural network. The ASR system may be either the ASR system 300 or the ASR system 400.

The process 600 begins at 605. The process may begin at 605 in response to a voice activity detector (not shown) indicating an input signal such as signal 305 or 405 includes a human voice. The process may begin at 605 by virtue of completing the recognition of a previous word at 660. The process 600 ends at 695 with the output of an output vector as previously described. The process 600 may be repeated as needed or continuously to recognize a series of words. When the vector memory has two banks in which to store feature vectors for two words, two instantiations of the process 600 may run concurrently.

At 610, the feature extractor partitions the input signal into a sequence of frames and generates a corresponding sequence of feature vectors, each of which that represents the input signal content during the corresponding frame. Every frame offset interval, a new feature vector is generated at 610. At 620 the second neural network processes each new feature vector from 610 to determine whether or not the sequence of feature vectors represents a recognizable word (e.g. a word from the vocabulary of the ASR system).

When the second neural network determines that the sequence of feature vectors contains, or is likely to contain, a recognizable word, the second neural network issues a start command that cause the vector memory to start accumulating (storing) sequential feature vectors at 630. The vector memory continues to store sequential feature vectors until a predetermined number of feature vectors have been accumulated at 640. The predetermined number may be, for example, the capacity of one bank of the vector memory.

After the predetermined number of feature vectors have been stored in the vector memory, the first neural network performs speech recognition processing on the content of the vector memory at 650 and outputs a recognition result, which may an output vector as previously described, at 660. The process 600 then ends at 695 or may repeat for a subsequent word.

Figure 7:
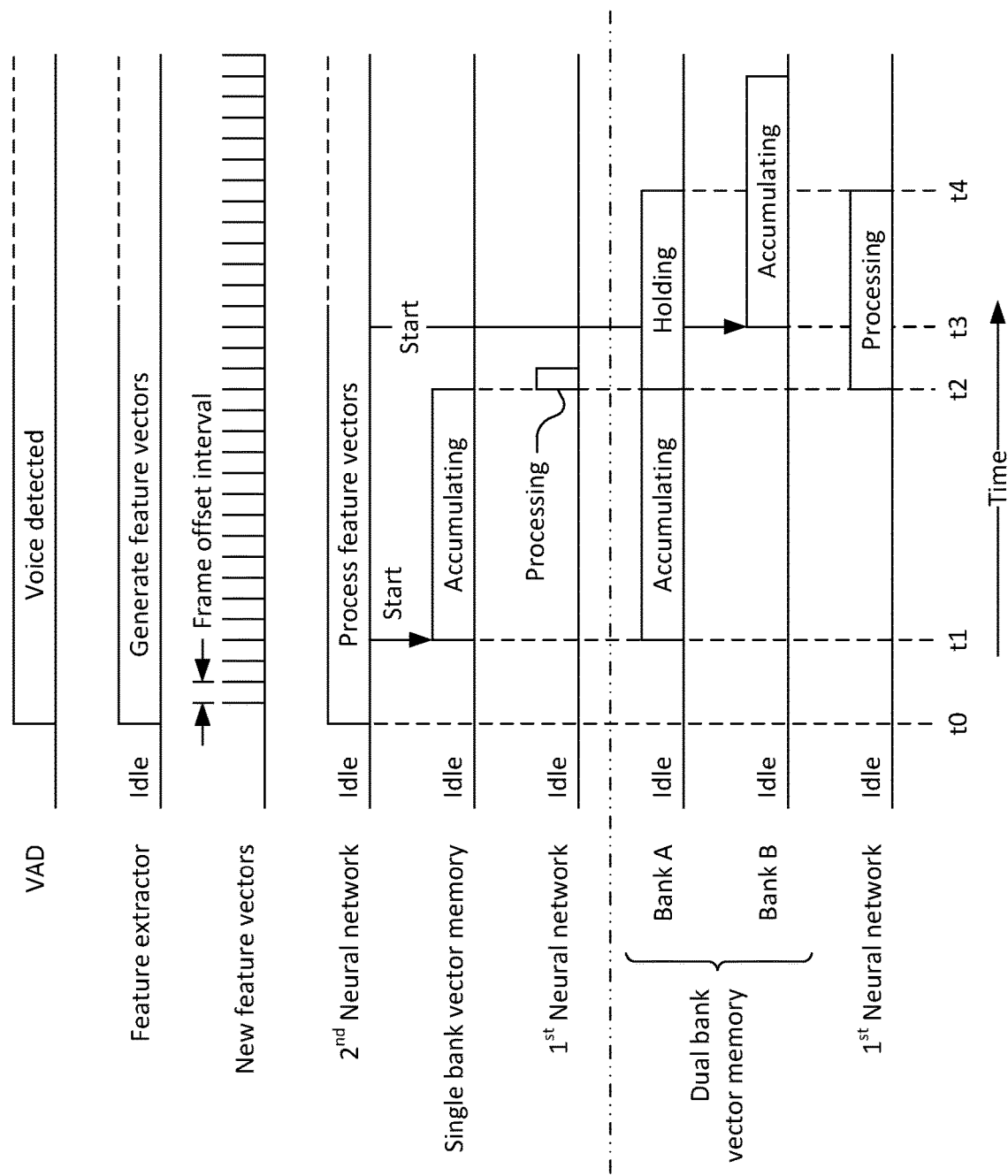
FIG. 7 is a timing diagram of the operations of the continuous speech recognition system of FIG. 6.

FIG. 7 is a timing diagram for the process 600 of FIG. 6. At time t0, a voice activity detector determines that an input such as signal 305 or 405 includes human voice content. At or immediately after t0, a feature extractor starts generating sequential feature vectors from the input, and a second neural network begins processing the features vectors as they are generated. A new feature vector is generated every frame offset interval. At time t1, the second neural network determines that the sequence of feature vectors contains, or is likely to contain, a recognizable word. At t1, the second neural network issue a "start" command that causes the vector memory to start to accumulate feature vectors. At time t2, a predetermined number of features vectors have been accumulated. At or immediately after t2, a first neural network performs speech recognition processing on the content of the vector memory to attempt to recognize a word.

When the vector memory has a single bank, the first neural network performs speech recognition processing on the content of the vector memory in a short time period, which may be all of, or a portion of, the frame offset interval between generation of successive feature vectors. When the vector memory has dual banks, the accumulated feature vectors may be held in one memory bank (bank A) while the first neural network performs speech recognition processing on the accumulated feature vectors over the time interval from t2 to t4. Concurrently, at time t3, the second neural network may issue a second start control, corresponding to a second word to be recognized, causing the vector memory to start accumulating feature vectors in its other memory bank (bank B). The functions of the two memory banks may be reversed for alternate words.

Figure 8:
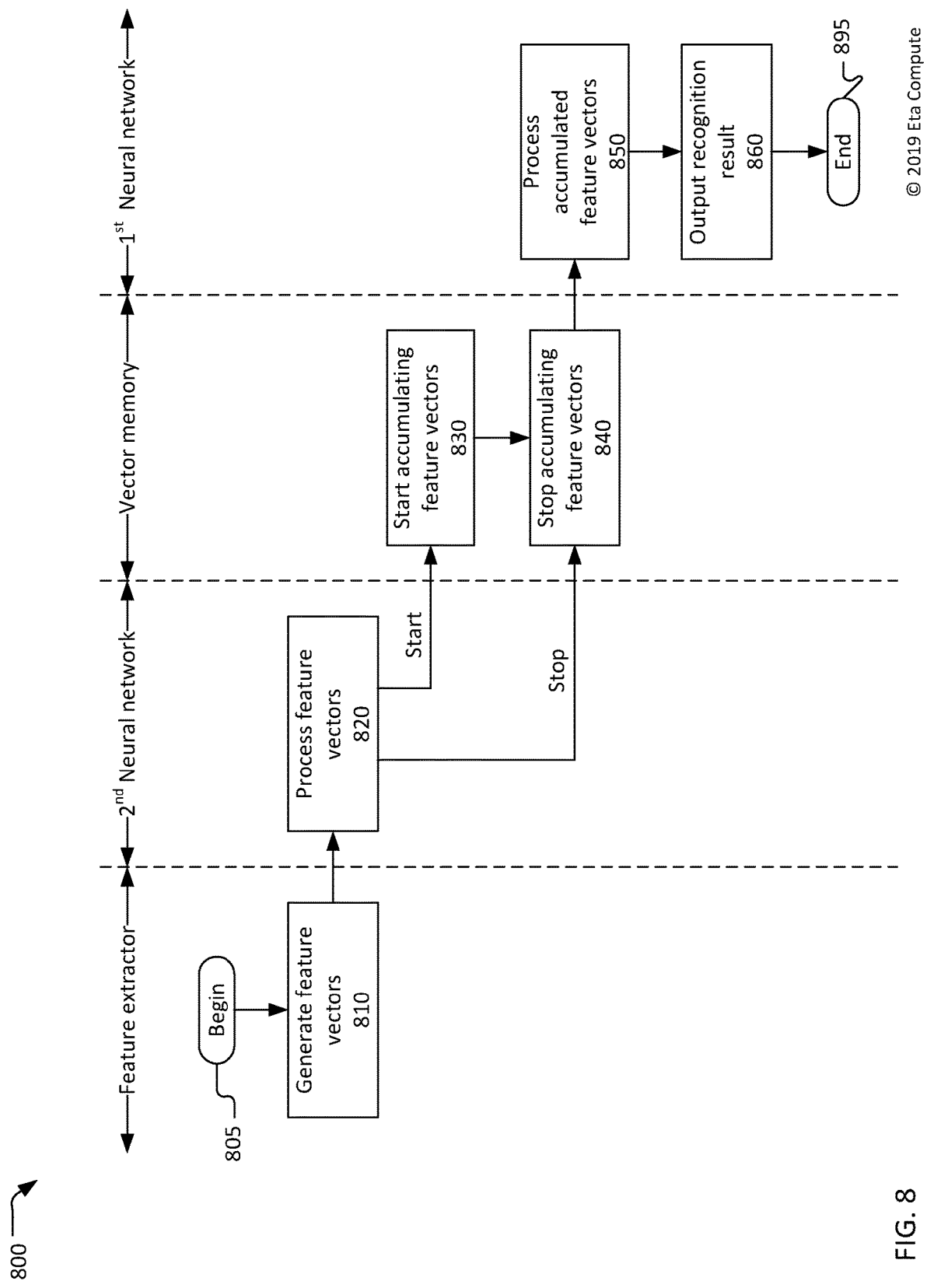
FIG. 8 is a flow chart of the operation of a continuous speech recognition system.

FIG. 8 is a flow chart of another process 800 for recognizing a word. The process 800 may be performed by an ASR system including a feature extractor, a first neural network, a vector memory, and a second neural network. The ASR system may be either the ASR system 300 or the ASR system 400.

The process 800 begins at 805 and ends at 895. The actions within the process 800 are generally similar to the corresponding actions in the process 600 of FIG. 6. Only the difference between the processes 600 and 800 will be described.

At 820 the second neural network processes each new feature vector from 810 to determine whether or not the sequence of feature vectors represents a recognizable word (i.e. a word from the vocabulary of the ASR system). When the second neural network determines that the sequence of feature vectors contains, or is likely to contain, a recognizable word, the second neural network issues a start command that causes the vector memory to start accumulating (storing) sequential feature vectors at 830. When the second neural network determines that a sufficient number of feature vectors have been stored in the vector memory, the second neural network issues a "stop" command that causes the vector memory to stop accumulating (storing) sequential feature vectors at 840. Thus the difference between the processes 600 and 800 is that, in the process 800, the number of feature vectors to be accumulated is determined by the second neural network rather than predetermined.

After the desired number of feature vectors have been stored in the vector memory, the first neural network performs speech recognition processing on the content of the vector memory at 850 and outputs a recognition result, which may an output vector as previously described, at 860. The process 800 then ends at 895 or may repeat for a subsequent word.

Figure 9:
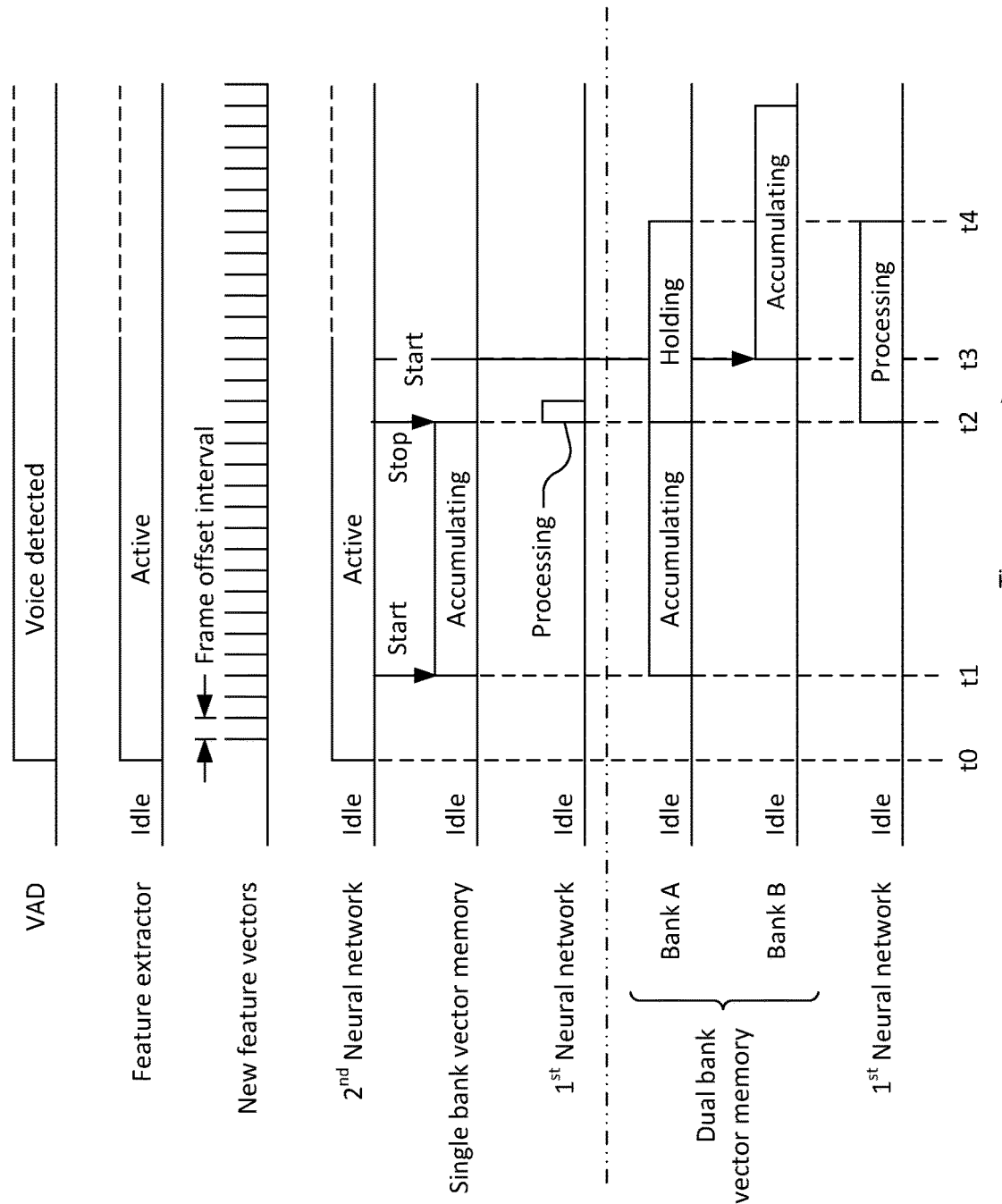
FIG. 9 is a timing diagram of the operations of the continuous speech recognition system of FIG. 8.

FIG. 9 is a timing diagram for the process 800 of FIG. 8. At time t0, a voice activity detector determines that an input includes human voice content. At or immediately after t0, a feature extractor starts generating sequential feature vectors from the input, and a second neural network begins processing the features vectors as they are generated. A new feature vector is generated each frame offset interval. At time t1, the second neural network determines that the sequence of feature vectors contains, or is likely to contain, a recognizable word. At t1, the second neural network issue a "start" command that causes the vector memory to start accumulating feature vectors. At time t2, the second neural network issue a "stop" command that causes the vector memory to stop accumulating feature vectors. At or immediately after t2, a first neural network performs speech recognition processing on the content of the vector memory to attempt to recognize a word.

When the vector memory has a single bank, the first neural network processes the accumulated feature vectors in a short time period, which may be all of, or a portion of, the frame offset interval between generation of successive feature vectors. When the vector memory has dual banks, the accumulated feature vectors may be held in one memory bank (bank A) while the first neural network performs speech recognition processing on the accumulated feature vectors over the time interval from t2 to t4. Concurrently, at time t3, the second neural network may issue a second start command, corresponding to a second word to be recognized, causing the vector memory to start accumulating feature vectors in its other memory bank (bank B). The functions of the two memory banks may alternate for alternate words.

Figure 10:
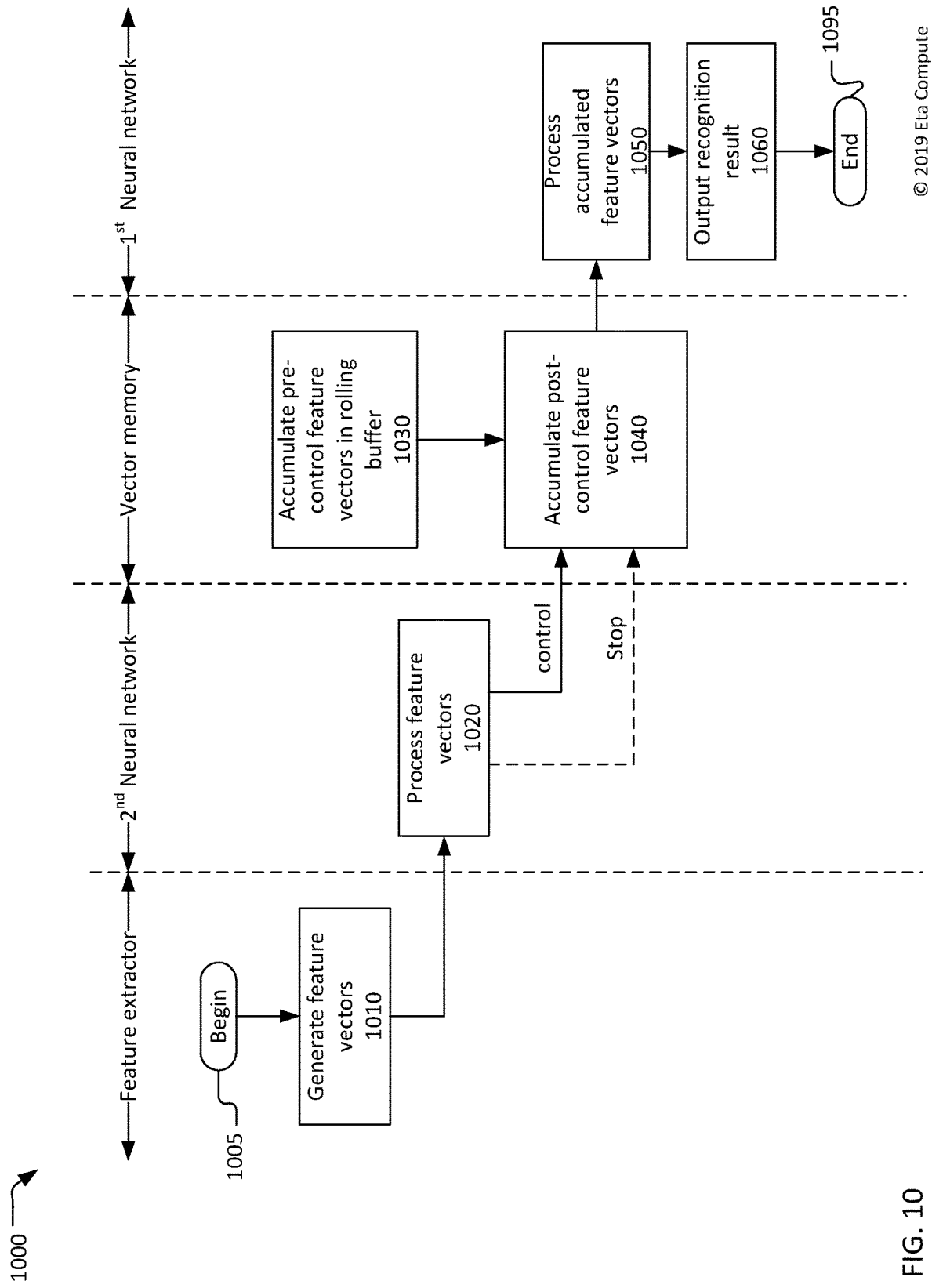
FIG. 10 is a flow chart of the operation of a continuous speech recognition system.

FIG. 10 is a flow chart of another process 1000 for recognizing a word. The process 1000 may be performed by an ASR system including a feature extractor, a first neural network, a vector memory, and a second neural network. The ASR system may be either the ASR system 300 or the ASR system 400.

The process 1000 begins at 1005 and ends at 1095. The actions within the process 1000 are generally similar to the corresponding actions in the process 800 of FIG. 8. Only the difference between the processes 800 and 1000 will be described.

At 1020 the second neural network processes each new feature vector from 1010 to determine whether or not the sequence of feature vectors represents a recognizable word (i.e. a word from the vocabulary of the ASR system). Concurrently, at 1030, the vector memory stores feature vectors in a rolling buffer. Since these feature vectors are accumulated in advance of any control being issued by the second neural network, they are referred to a "pre-control" or "pre" feature vectors. The number of pre-control feature vectors accumulated in the rolling buffer may be predetermined. When the second neural network determines that the sequence of feature vectors contains, or is likely to contain, a recognizable word, the second neural network issues a "control" command that causes the vector memory to hold the accumulated pre-control feature vectors and begin accumulating post-control feature vectors at 1040. The vector memory may accumulate a predetermined number of post control feature vectors. Alternatively, the vector memory may accumulate post-control feature vectors until the second neural network issues a "stop" command that causes the vector memory to stop accumulating (storing) sequential feature vectors at 840. A primary difference between the processes 800 and 1000 is that, in the process 1000, the accumulated feature vectors include a predetermined number of feature vectors generated before the second neural network determines that the sequence of feature vectors represents a recognizable word.

A variation of the process 1000 is for the second neural network to only issue the stop command, such that all of the accumulated feature vectors occur prior to the stop command. In this case, the task of the second neural network is to determine when all, or a sufficient number, of feature vectors representing a recognizable work have been accumulated.

After the desired number of post-control feature vectors have been stored in the vector memory, the first neural network performs speech recognition processing on the content of the vector memory at 1050 and outputs a recognition result, which may an output vector as previously described, at 1060. The process 1000 then ends at 1095 or may repeat for a subsequent word.

Figure 11:
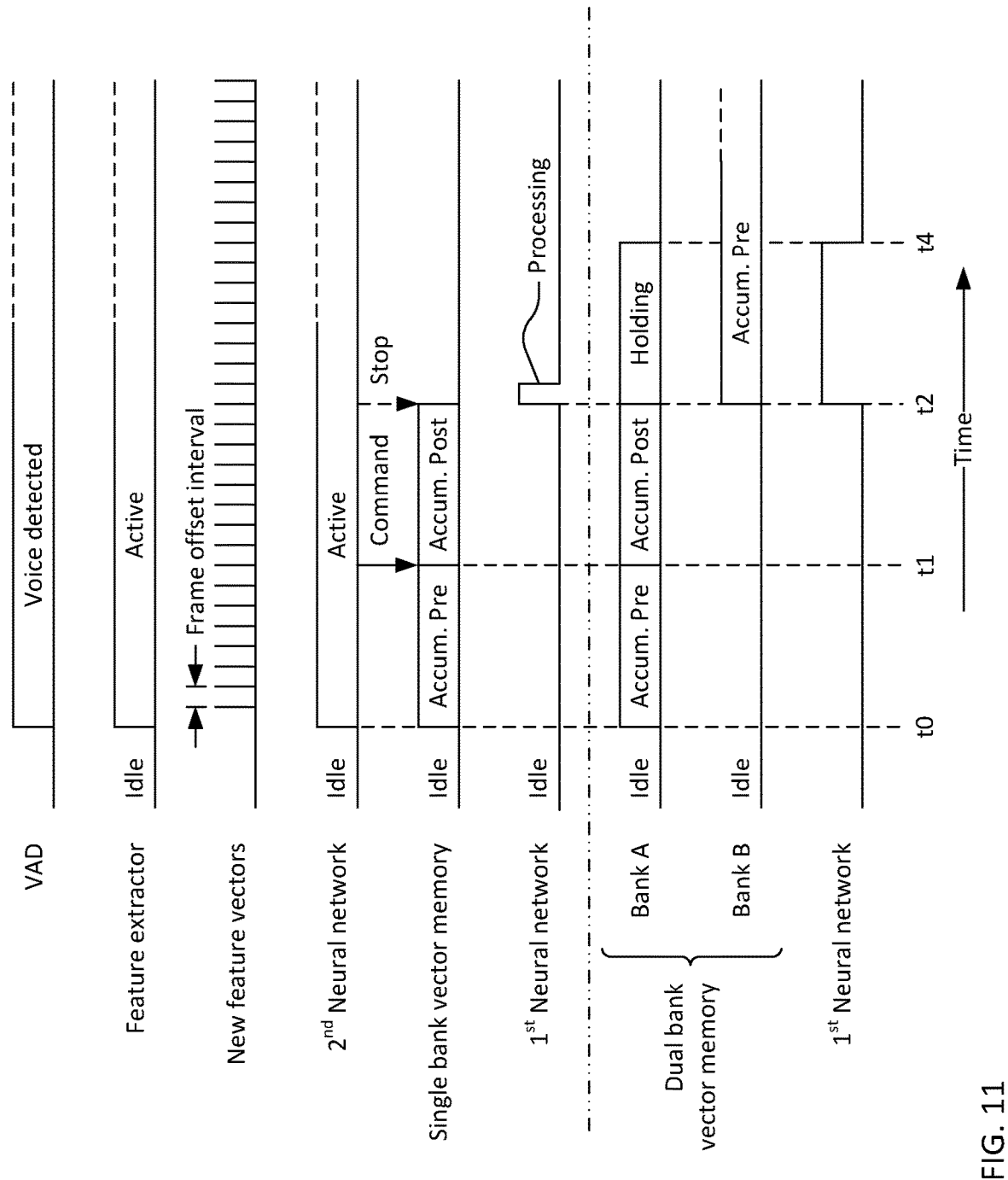
FIG. 11 is a timing diagram of the operations of the continuous speech recognition system of FIG. 10.

FIG. 11 is a timing diagram for the process 1000 of FIG. 10. At time t0, a voice activity detector determines that an input includes human voice content. At or immediately after t0, a feature extractor starts generating sequential feature vectors from the input, a second neural network begins processing the feature vectors as they are generated, and a vector memory starts storing pre-control feature vectors in a rolling buffer. At time t1, the second neural network determines that the sequence of feature vectors contains, or is likely to contain, a recognizable word. At t1, the second neural network issue a control that causes the vector memory to start accumulating post-control feature vectors. The vector memory may accumulate a predetermine number of post control feature vectors between t1 and time t2. Alternatively, at time t2, the second neural network issue a "stop" control that causes the vector memory to stop accumulating feature vectors. At or immediately after t2, a first neural network performs speech recognition processing on the content of the vector memory to attempt to recognize a word.

When the vector memory has a single bank, the first neural network processes the accumulated feature vectors in a short time period, which may be all of, or a portion of, the frame offset interval between generation of successive feature vectors. When the vector memory has dual banks, the accumulated feature vectors may be held in one memory bank (bank A) while the first neural network performs speech recognition processing on the accumulated feature vectors over the time interval from t2 to t4. Concurrently, starting at time t2, a second bank (bank B) of the vector memory accumulates pre-control feature vectors (for a next word) in a rolling buffer. The functions of the two memory banks may be reversed for alternate words.

Figure 12:
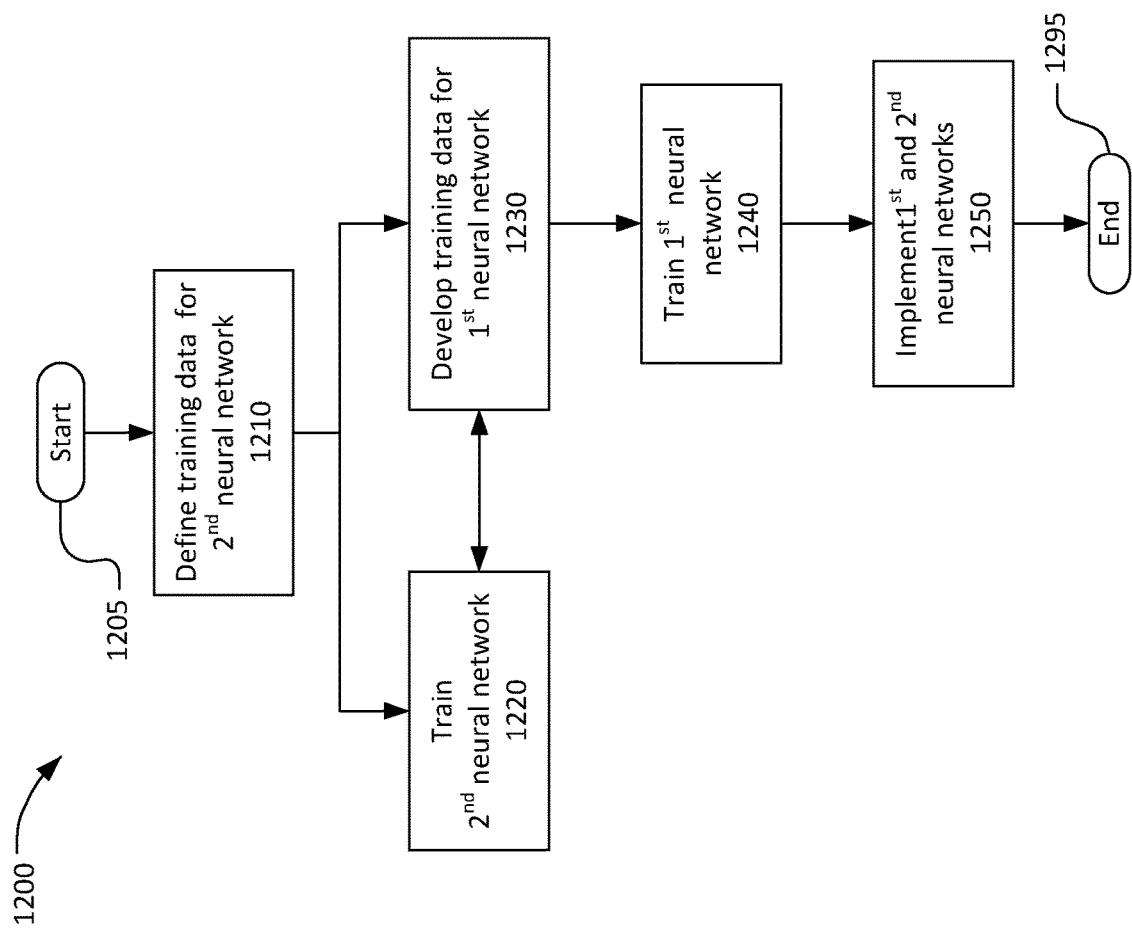
FIG. 12 is a flow chart of a method for training a continuous speech recognition system.

FIG. 12 is a flow chart of a process 1200 for training an ASR system incorporating first and second neural networks, such as training the ASR system 300 of FIG. 3 or the ASR system 400 of FIG. 4 prior to use as a continuous ASR system. The process 1200 starts at 1205 and ends at 1295.

At 1210, training data for training the second neural network is defined. Commonly, an ASR system is trained using audio data that includes each word in the vocabulary of the ASR system spoken multiple times by multiple people. To train the second neural network, this audio data is converted into corresponding sequences of feature vectors using the same scheme for framing and feature extraction that will be used in the ASR system. For example, an ASR system with a twenty-word vocabulary may be trained using audio data of ten people speaking each of the twenty words, with five repetitions of each word by each person. This audio data would be converted into a total of 1000 sequences of feature vectors with about 20 to more than 100 vectors in each sequence.

At 1220, the second neural network may be trained using the training data from 1210, knowledge of what each word in the training data actually is, and known techniques for training recurrent neural networks such as echo state networks. The training at 1220 may include adjusting weights and other parameters of the second neural network to maximize the likelihood that the second neural network outputs the appropriate commands for each sequence of feature vectors corresponding to a word within the ASR system vocabulary.

At 1230, training data for training the first neural network is developed. The training data for the first neural network is the expected contents of a vector memory within the ASR system when the first neural network is controlled to perform speech recognition processing on the content of the vector memory to recognize a word. Each sequence of feature vectors applied to the second neural network will result in a corresponding group of features vectors accumulated in a vector memory. Since the number and position of feature vectors accumulated in the vector memory depends on controls provided by the second neural network, the development of training data set at 1230 must be performed concurrently with, or after, the training of the second neural network at 1220.

At 1240, the first neural network may be trained using the training data from 1230 and known techniques for training deep neural networks such as convolutional neural networks. The training at 1240 may include adjusting parameters of the first neural network to maximize the likelihood that its output vector for a group of training feature vectors indicates the appropriate word from the ASR system vocabulary.

At 1250, the first and second neural networks may be implemented, typically by creating software instructions to cause one or more processors to perform the functions of the neural networks as described with respect to FIG. 5.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An automatic speech recognition (ASR) system, comprising:
    a vector memory to store a plurality of feature vectors sequentially extracted from an audio data stream;
    a first neural network to perform speech recognition processing on feature vectors stored in the vector memory to attempt to recognize a word from a predetermined vocabulary; and
    a second neural network to control when the first neural network performs the speech recognition processing;
    wherein the first neural network is held in a quiescent state except when performing the speech recognition processing under control of the second neural network.

2. The system of claim 1, wherein the second neural network controls when the first neural network performs the speech recognition processing based on the sequentially extracted feature vectors.

3. The system of claim 2, wherein the second neural network causes the first neural network to perform the speech recognition processing when the second neural network determines that the feature vectors stored in the vector memory are likely to represent a word from the predetermined vocabulary.

4. The system of claim 2, wherein
    the second neural network is configured to send a start command to the vector memory to cause the vector memory to store a predetermined number of sequential feature vectors, and
    the first neural network performs speech recognition processing on the predetermined number of sequential feature vectors stored in the vector memory.

5. The system of claim 2, wherein
    the second neural network is configured to send a start command to the vector memory to cause the vector memory to start to store sequential feature vectors,
    the second neural network is further configured to send a stop command to the vector memory to cause the vector memory to stop storing sequential feature vectors, and the first neural network performs speech recognition processing on the sequential feature vectors that were stored in the vector memory between the start command and the stop command.

6. The system of claim 2, wherein
the vector memory is configured to store a predetermined number of sequential feature vectors in a rolling buffer;
the second neutral network is configured to send to control command to the vector memory to cause the vector memory to freeze the content of the rolling buffer and to store a second predetermined number of additional sequential feature vectors, and
the first neural network performs speech recognition processing on the content of the rolling buffer and the additional feature vectors stored in the vector memory.

7. The system of claim 2, wherein
the vector memory is configured to store a predetermined number of sequential feature vectors in a rolling buffer,
the second neutral network is configured to send to control command to the vector memory to cause the vector memory to freeze the content of the rolling buffer and to start storing additional sequential feature vectors,
the second neural network is further configured to send a stop command to the vector memory to cause the vector memory to stop storing additional feature vectors, and
the first neural network performs speech recognition processing on the content of the rolling buffer and the additional feature vectors that were stored in the vector memory between the control command and the stop command.

8. The system of claim 2, wherein
the vector memory is configured to store sequential feature vectors in a rolling buffer,
the second neural network is further configured to send a stop command to the vector memory to cause the vector memory to stop storing feature vectors, and
the first neural network performs speech recognition processing on the content of the vector memory after the stop command.

9. The system of claim 1, wherein the first neural network comprises:
a plurality of neurons,
wherein the first neural network does not store the state of any of the plurality of neurons.

10. The system of claim 9, wherein the first neural network is a convolutional neural network.

11. The system of claim 1, wherein the second neural network comprises:
a plurality of neurons, wherein
at least some of the plurality of neurons store one or more prior states, and
at least some of the plurality of neurons receive, as inputs, one or more stored prior states.

12. The system of claim 11, where the second neural network is an echo state network.

13. The system of claim 1, wherein:
the vector memory comprises a single memory bank for storing sequential feature vectors, and
the first neural network is configured to perform the speech recognition processing on the content of the vector memory within a time interval between sequential feature vectors.

14. The system of claim 1, wherein:
the vector memory comprises two or more memory banks for storing sequential feature vectors,
at least one of the two or more memory banks for accumulating sequential feature vectors, and
at least one other of the two or more memory banks storing feature vectors for speech recognition processing by the first neural network.

15. A method for automatically recognizing words within a predetermined vocabulary, comprising:
storing, in a vector memory, a plurality of feature vectors sequentially extracted from an audio data stream;
a first neural network performing speech recognition processing on feature vectors stored in the vector memory to attempt to recognize a word from the predetermined vocabulary;
a second neural network controlling when the first neural network performs the speech recognition processing; and
holding the first neural network in a quiescent state except when performing the speech recognition processing under control of the second neural network.

16. The method of claim 15, wherein the second neural network controlling when the first neural network performs the speech recognition processing comprises:
the second neural network causing the first neural network to perform the speech recognition processing when the second neural network determines that the feature vectors stored in the vector memory are likely to represent a word from the predetermined vocabulary.

17. The method of claim 15, wherein the second neural network controlling when the first neural network performs the speech recognition processing comprises:
the second neural network sending a start command to the vector memory to cause the vector memory to store a predetermined number of sequential feature vectors, and
the first neural network performing speech recognition processing when the predetermined number of sequential feature vectors are stored in the vector memory.

18. The method of claim 15, wherein the second neural network controlling when the first neural network performs the speech recognition processing comprises:
the second neural network is configured sending a start command to the vector memory to cause the vector memory to start to store sequential feature vectors,
the second neural network sending a stop command to the vector memory to cause the vector memory to stop storing sequential feature vectors, and
the first neural network performing speech recognition processing on the sequential feature vectors that were stored in the vector memory between the start command and the stop command.

19. The method of claim 15, wherein the second neural network controlling when the first neural network performs the speech recognition processing comprises:
the vector memory storing a predetermined number of sequential feature vectors in a rolling buffer;
the second neutral network sending a control command to the vector memory to cause the vector memory to freeze the content of the rolling buffer and to store a second predetermined number of additional sequential feature vectors, and
the first neural network performing speech recognition processing on the content of the rolling buffer and the additional feature vectors when the second predetermined number of additional feature vectors are stored in the vector memory.

20. The method of claim 15, wherein the second neural network controlling when the first neural network performs the speech recognition processing comprises:
- the vector memory storing a predetermined number of sequential feature vectors in a rolling buffer,
- the second neutral network sending a control command to the vector memory to cause the vector memory to freeze the content of the rolling buffer and to start storing additional sequential feature vectors,
- the second neural network sending a stop command to the vector memory to cause the vector memory to stop storing additional feature vectors, and
- the first neural network performing speech recognition processing on the content of the rolling buffer and the additional feature vectors that were stored in the vector memory between the control command and the stop command.

21. The method of claim 15, wherein the second neural network controlling when the first neural network performs the speech recognition processing comprises:
- the vector memory storing sequential feature vectors in a rolling buffer,
- the second neural network sending a stop command to the vector memory to cause the vector memory to stop storing feature vectors, and
- the first neural network performing speech recognition processing on the content of the vector memory after the stop command.

* * * * *